United States Patent [19]

Loy et al.

[11] Patent Number: 5,446,789
[45] Date of Patent: Aug. 29, 1995

[54] ELECTRONIC DEVICE HAVING ANTENNA FOR RECEIVING SOUNDWAVES

[75] Inventors: Robert D. Loy, Whitney Point; Osvaldo A. Mantilla, Endicott, both of N.Y.

[73] Assignee: International Business Machines Corporation, Armonk, N.Y.

[21] Appl. No.: 390,142

[22] Filed: Feb. 17, 1995

Related U.S. Application Data

[63] Continuation of Ser. No. 150,674, Nov. 10, 1993, abandoned.

[51] Int. Cl.6 ............................................. H04M 1/00
[52] U.S. Cl. .................................... 379/433; 379/434
[58] Field of Search ............... 379/433, 428, 429, 434, 379/58, 59, 61; 455/89, 90

[56] References Cited

U.S. PATENT DOCUMENTS

| | | | |
|---|---|---|---|
| 4,335,281 | 6/1982 | Scott et al. | 379/430 |
| 5,001,772 | 3/1991 | Holcomb et al. | 455/90 |
| 5,008,682 | 4/1991 | Blaese | 343/713 |
| 5,127,050 | 6/1992 | Takahashi et al. | 379/428 |
| 5,197,091 | 3/1993 | Takagi et al. | 379/433 |

FOREIGN PATENT DOCUMENTS

| | | |
|---|---|---|
| 0348677 | 5/1989 | European Pat. Off. |
| 1319197 | 12/1989 | Japan |
| 2228820 | 5/1990 | United Kingdom |
| 9104461 | 4/1991 | WIPO |
| 9213347 | 12/1992 | WIPO |

*Primary Examiner*—James L. Dwyer
*Assistant Examiner*—Jack Chiang
*Attorney, Agent, or Firm*—Lawrence R. Fraley

[57] ABSTRACT

An electronic device, e.g., a cellular phone, which includes an extendable antenna for receiving electronic signals, the antenna being of hollow configuration and designed for receiving sound waves at a designated receiving portion thereon and for directing the sound waves through the hollow portion whereby the waves strike a microphone located within the device's housing. The device may also include a computer function to expand the capabilities of the device.

10 Claims, 3 Drawing Sheets

ELECTRONIC DEVICE HAVING ANTENNA FOR RECEIVING SOUNDWAVES

This application is a continuation, of application Ser. No. 08/150,674, filed Nov. 10, 1993 now abandoned.

TECHNICAL FIELD

The invention relates to electronic devices having antenna structures for receiving electronic signals, one example of such a device being a portable cellular telephone.

BACKGROUND OF THE INVENTION

Electronic devices such as portable cellular telephones are known in the art, one example being described in U.S. Pat. No. 5,001,772 (Holcomb et al). As is known, these devices typically utilize an extending antenna of metallic material (e.g., aluminum), and, in more recent versions, may include a flexible rubber or similar outer protective material should flexibility of the antenna be desired. Typically, metallic (e.g., aluminum) types of antennas of the telescoping type are non-flexible in nature.

As shown in U.S. Pat. No. 5,001,772, such cellular telephones of the portable variety typically include an elongated housing necessary to effectively separate the microphone and speaker portions for the phone user. Alternatively, other recent versions of such cellular telephones have utilized a foldable housing to thus assure, like the aforementioned fixed elongated housing in U.S. Pat. No. 5,001,772, appropriate spacing between the speaker and microphone portions to allow for effective phone usage. In such foldable phones, it has been typically necessary to also extend an antenna (e.g., of the telescopic variety) a predetermined distance from the housing, in addition to unfolding the housing to the desired length.

In either case, it has heretofore been necessary to either provide a housing of substantial length or requiring folding or similar treatment in order to effectively operate the cellular telephone.

It is believed, that an electronic device, particularly a portable cellular telephone, as defined herein, which is capable of overcoming the above-cited disadvantages of known such devices, would constitute a significant advancement in the art.

DISCLOSURE OF THE INVENTION

It is, therefore, a primary object of the present invention to enhance the art of electronic devices, and particularly those of the portable cellular telephone variety.

It is another object of the present invention to provide an electronic device which obviates the aforementioned disadvantages of known such devices.

It is yet another object of the present invention to provide such a device which is of relatively simple construction and which can be manufactured at relatively low cost.

In accordance with one aspect of the invention, there is provided an electronic device comprising a housing, microphone means located within the housing, and an antenna positioned within or upon the housing and adapted for receiving electronic signals over an established frequency range. The antenna includes a hollow body portion operatively coupled to the microphone means and adapted for being extended a predetermined distance from the housing, this antenna further including a receiving portion located relative to the hollow body portion and adapted for receiving sound waves. The hollow body portion directs the sound waves received by the receiving portion toward the microphone means whereby the microphone means will receive these.

BEST MODE FOR CARRYING OUT THE INVENTION

For a better understanding of the present invention, together with other and further objects, advantages and capabilities thereof, reference is made to the following disclosure in connection with the above-described drawings.

Figure 1:
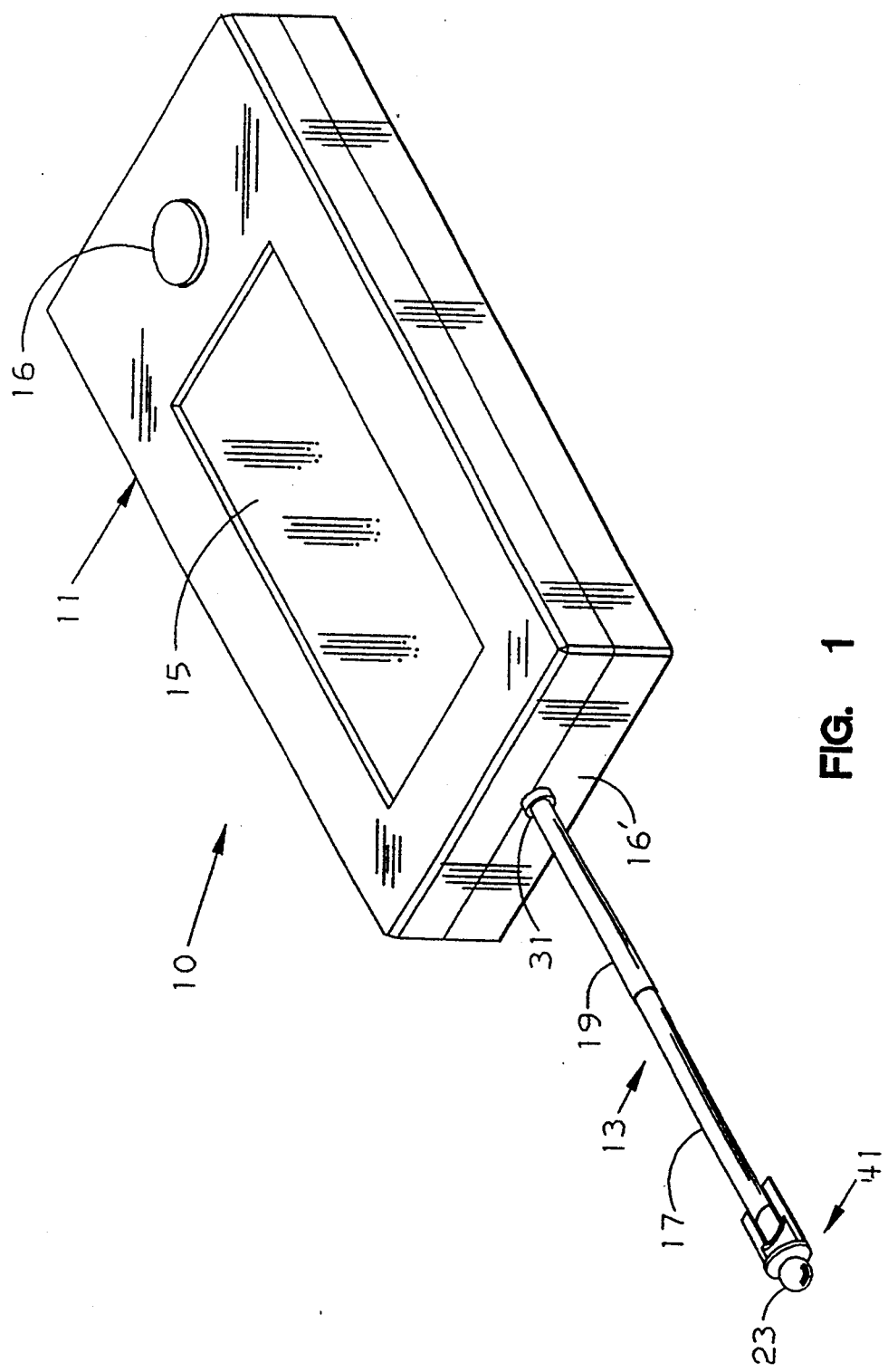
FIG. 1 is a perspective view of an electronic device in accordance with one embodiment of the invention.

In FIG. 1, there is shown an electronic device 10 in accordance with a preferred embodiment of the invention. Device 10, in the embodiment depicted in the drawings, comprises a portable cellular telephone. It is understood, however, that the invention is not limited to such cellular telephones, in that the teachings hereof may be applicable to practically any electronic device which utilizes an antenna for the purpose of receiving electronic signals and which also includes microphone means as part thereof, other examples of such devices being citizens band (CB) radios and wireless intercommunication units such as airplane intercoms.

In the particular embodiment as defined herein, the portable cellular telephone is further adapted for providing additional functions, one primary example being to include as part thereof a computer which, as understood, will significantly enhance the operational capabilities of the invention. In one example, this additional computer may function to send and receive electronic facsimiles (faxes), calendars, and associated databases. Such a computer could further include loading and storage capabilities for games and other programs, as well as expansion means should additional capabilities be desired. Device 10 may also include an internal modem for modulating/demodulating signals received by or transmitted from the telephone. This modem, not shown in the drawings, would be incorporated within the invention's housing 11.

As shown in the drawings, device 10 includes an extending antenna 13 which is positioned within or upon the housing and designed for receiving the desired electronic signals. Should device 10 further include a computer function, as mentioned, housing 11 will further preferably include a touch sensitive screen 15 and adjacent speaker 16. Use of a touch sensitive screen allows the telephone operator to selectively perform necessary or desired functions during operation of the invention. The screen, as shown in FIG. 1, is preferably planar and thus eliminates the need for a series of protruding buttons or the like as typically required in many telephones, including those of the portable cellular variety.

Housing 11 is preferably plastic (e.g., polycarbonate), and, as shown, of unitary, non-foldable construction. That is, housing 11 comprises a single, integral unit of substantially boxlike configuration. In one example, housing 11 includes a length of only about 5.3 inches, a width of only about 3.0 inches and a thickness of only about 1.6 inches. The above dimensions clearly illustrate the compactness of design of the invention. In such a structure, antenna 13 was capable of projecting a total distance of about 2.0 inches from the respective sidewall 16 on which the antenna is located or through which the antenna may be positioned. (As seen in FIGS. 3 and 4, antenna 13 extends through sidewall 16' and partially projects within the interior of housing 11).

Antenna 13 is preferably of the telescoping variety and thus includes a plurality of individual extending segments 17, 19 and 21. The larger segment 21, as seen in FIGS. 3 and 4, is preferably located internally of housing 11, with segments 17 and 19 extending therefrom in telescoping fashion. All three segments represent a hollow body portion for antenna 13 which, as understood, represents a significant feature of the present invention.

Each of the segments 17, 19 and 21 are preferably metallic, e.g., aluminum. Other materials may be utilized, including conductive polycarbonates, plated and stainless steels, etc.

Figure 2:
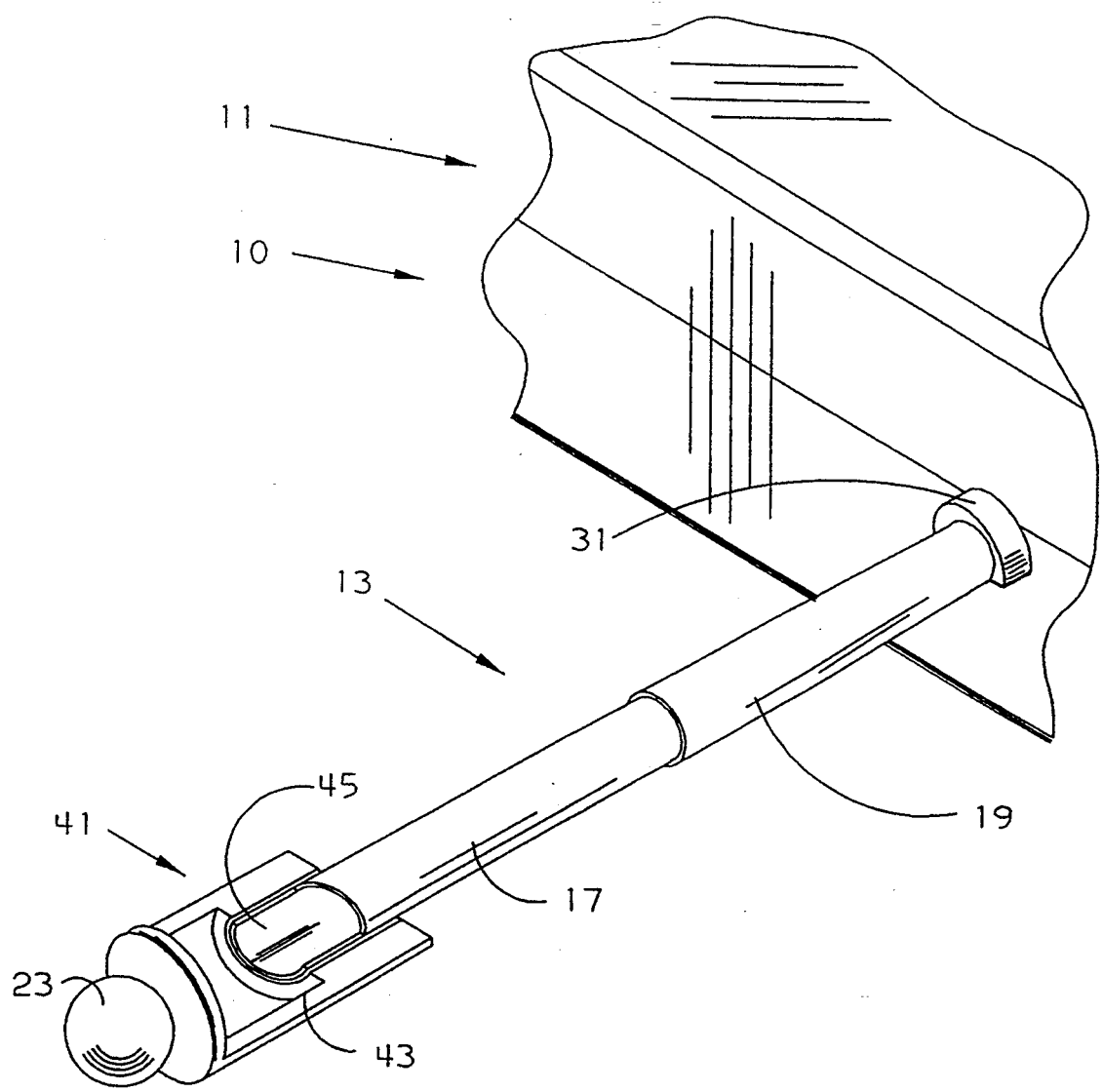
FIG. 2 is a much enlarged, partial view of the electronic device of FIG. 1, illustrating in greater detail the terminal end of the device's extendable antenna.
Figure 3:
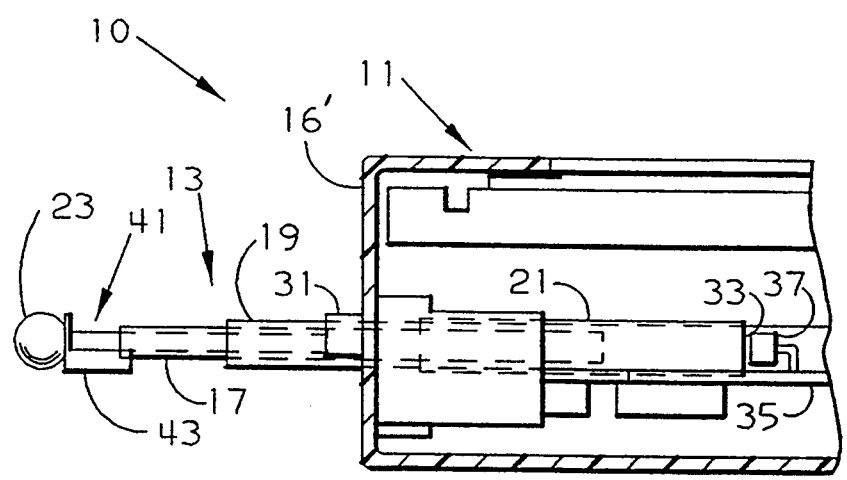
FIG. 3 is an enlarged side view, partly in section, of the device of FIG. 1, illustrating some of the internal components thereof in relation to the device's antenna, the antenna shown in a partly extended position.
Figure 4:
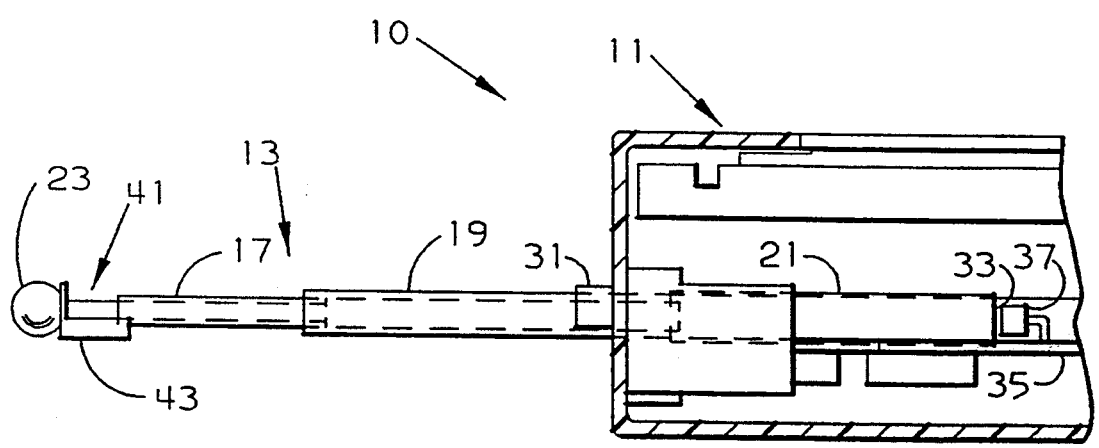
FIG. 4 is a similar view as in FIG. 3, with the antenna extended much further.

Antenna 13 is shown in FIG. 3 as being only partially extended from housing 11 and in FIG. 4 as further extended. It is understood in FIG. 3 that antenna 13 may be closed even further than depicted. In one example, antenna 13, when fully closed, may lie flush with the outer surface of sidewall 16 with appropriate means for the telephone user to readily grasp the forward terminal end 23 to thereby effect such extension when desired. A shield 31 (see especially FIG. 2) is preferably utilized, the shield only partially surrounding the upper part of segment 19 and designed for aligning with (and thus accommodating) associated portions (described below) of the outermost part of antenna 13.

As seen in FIGS. 3 and 4, the larger cylindrical segment 21 of antenna 13 is internally positioned within housing 11 and, significantly, includes an opening 33 within an end thereof. This segment 21 is further positioned upon a printed circuit board 35 also designed for having other various electronic components (e.g., microprocessor and/or logic chips, in addition to discrete components) which may form part of the cellular telephone and/or the aforementioned computer. Significantly, also positioned on circuit board 35 is a microphone 37 which, as shown, is located adjacent the opening 33 in segment 21, and spaced a short distance from opening 33. Microphone 37, as defined herein, is designed for receiving sound waves and thereafter converting these waves into various electronic signals, which are then transmitted into the circuitry (not shown) of circuit board 35 for additional processing.

In accordance with the unique teachings herein, antenna 13 further includes a receiving portion 41 which, as shown in FIG. 2, is located relative to the terminal end of extending hollow segment 17. Specifically, receiving portion 41 comprises a circular or curved member 43 which partially surrounds the exposed opening 45 in segment 17. Member 43 is designed for directing sound waves (e.g., from the telephone user) into opening 10 and, significantly, through the hollow body portion of antenna 13 whereupon these directed sound waves will impinge upon microphone 37. Accordingly, the invention combines the use of an extending antenna to receive and direct sound waves toward the invention's internal microphone means for further processing. The invention thus eliminates the need for an elongated housing or housing of a foldable type with an external microphone or the like, to thus assure a compact, lightweight design and the many advantages associated therewith.

It is understood that use of a curved member 43 as shown is preferred in order to provide sound wave collection and direction in the manner taught herein. However, in the broadest aspects of the invention, it is possible to simply provide an opening or similar slot of particular configuration within the furthermost extending segment 17 such that sound waves, when received, will pass through this exposed opening and through the hollow segments to microphone 37. As stated, however, a curved or similar member is preferred for more effective soundware collection and direction.

In a preferred embodiment, circular member 43 is also metallic, e.g., aluminum.

Although a telescoping antenna has been shown and described, the invention is not limited thereto. Specifically, it is within the scope of this invention to provide a flexible-type antenna of relatively fixed orientation on housing 11. Such an antenna would of course be hollow and have an appropriate receiving portion at a designated location (e.g., at the terminal end) thereof. It is also within the scope of the invention to utilize the receiving portion at a location other than at the outermost end of the antenna, as shown herein. For example, it may be possible to provide such a receiving portion at an interim location, (e.g., within segment 19 ) to thereby enable extended projection of the antenna beyond that desired for voice reception, this reception thus occurring at the same relative location from sidewall 16' as described above. In a preferred embodiment of the invention, the receiving portion 41 will be preferably located at a distance of about 6.5 inches from the center of speaker 16 during operation of the invention. It is desirable to provide variable distances (e.g., 5.6–7 inch range) between the speaker and receiving portions to accomodate different distances between various user's ears and mouths.

Thus there has been shown and described an electronic device which utilizes an antenna in a dual functioning manner to receive both electronic signals as well as for receiving sound waves and directing these internally of the structure. The invention as defined herein is of extremely compact design and readily usable by the average consumer. Further, the invention is of relatively simple construction, thus assuring an end product of relatively low cost to the consumer. As also defined herein, the invention is capable of possessing many additional capabilities, including a computer function, to thereby expand the operation of the invention well beyond those capabilities normally associated with most portable cellular telephones in the prior art. The invention as defined herein is also of relatively lightweight construction, in one embodiment weighing only about 17 ounces.

While there have been shown and described what are at present considered the preferred embodiments of the invention, it will be obvious to those skilled in the art that various changes and modifications can be made therein without departing from the scope of the invention as defined by the appended claims.

What is claimed is:

1. An electronic device comprising:
    a housing;
    a printed circuit board located within said housing, said printed circuit board adapted for having various electronic components thereon;
    microphone means positioned on said printed circuit board located within said housing; and
    an antenna positioned within or upon said housing and adapted for receiving electronic signals over an established frequency range, said antenna including a hollow body portion operatively coupled to said microphone means and adapted for being extended a predetermined distance from said housing, said antenna further including a receiving portion located relative to said hollow body portion and adapted for receiving sound waves, said hollow body portion including a segment positioned within said housing on said printed circuit board adjacent said microphone means and at a spaced distance from said microphone means, said hollow body portion including an opening and directing said sound waves received by said receiving portion toward said microphone means through said opening whereby said microphone means will receive said sound waves.

2. The electronic device of claim 1 wherein said device is capable of being hand held.

3. The electronic device of claim 2 wherein said device is a cellular phone.

4. The electronic device of claim 3 wherein said device further includes a computer function.

5. The electronic device of claim 4 wherein said device includes a touch sensitive screen and a speaker.

6. The electronic device of claim 1 wherein said segment of said hollow body portion of said antenna is of cylindrical configuration, said hollow body portion including a second segment adapted for moving within said cylindrical segment.

7. The electronic device of claim 6 wherein said antenna is telescoping.

8. The electronic device of claim 1 wherein said antenna is flexible.

9. The electronic device of claim 1 wherein said receiving portion of said antenna comprises an opening within said hollow body portion.

10. The electronic device of claim 9 further including a curved member on said hollow body portion of said antenna adjacent said opening of said receiving portion, said curved member directing said sound waves into said body portion.

* * * * *